(12) United States Patent
Kim et al.

(10) Patent No.: US 9,918,603 B2
(45) Date of Patent: Mar. 20, 2018

(54) SENSOR MODULE AND ROBOT CLEANER HAVING THE SAME

(71) Applicant: SAMSUNG ELECTRONICS CO., LTD., Suwon-si, Gyeonggi-do (KR)

(72) Inventors: Byung Chan Kim, Yongin-si (KR); Sang Sik Yoon, Gimpo-si (KR); Kyong Su Kim, Gwangju (KR); Dong Won Kim, Hwaseong-si (KR); Jea Yun So, Suwon-si (KR); Yeon Kyu Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 794 days.

(21) Appl. No.: 14/247,819

(22) Filed: Apr. 8, 2014

(65) Prior Publication Data

US 2014/0304937 A1 Oct. 16, 2014

(30) Foreign Application Priority Data

Apr. 11, 2013 (KR) .................. 10-2013-0039847

(51) Int. Cl.
*A47L 9/28* (2006.01)
*G05D 1/02* (2006.01)
(Continued)

(52) U.S. Cl.
CPC .............. *A47L 9/28* (2013.01); *A47L 9/009* (2013.01); *A47L 9/2805* (2013.01);
(Continued)

(58) Field of Classification Search
CPC ........ A47L 9/28; A47L 9/009; A47L 2201/04; A47L 9/2805; G05D 1/0246;
(Continued)

(56) References Cited

U.S. PATENT DOCUMENTS 6,142,252 A 11/2000 Kinto et al.
9,599,745 B2 * 3/2017 Hsu .......................... G01V 8/12
(Continued)

FOREIGN PATENT DOCUMENTS

KR 10-2005-0012052 1/2005
KR 10-0638220 10/2006
(Continued)

OTHER PUBLICATIONS

Extended Search Report dated Jul. 17, 2017 from European Patent Application No. 14162050.0, 30 pages.

*Primary Examiner* — David Redding
(74) *Attorney, Agent, or Firm* — Staas & Halsey LLP

(57) ABSTRACT

A sensor module and a robot cleaner including the sensor module may provide accurate sensing of an obstacle and prevent an erroneous sensing of an obstacle. The robot cleaner may include a body including a cleaning unit to remove foreign substances from a surface of a floor, a cover to cover an upper portion of the body, a sensor module including an obstacle sensor mounted to sense an obstacle, and a sensor window provided at one side of the sensor module. The sensor module may include a light emitting device to emit light through the sensor window, a light receiving reflector on which light reflected from the obstacle is incident, and a light shielding portion interposed between the light emitting device and the light receiving reflector to block the light emitted from the light emitting device from being incident upon the light receiving reflector.

15 Claims, 9 Drawing Sheets

(51) Int. Cl.
*G01S 17/48* (2006.01)
*G01S 17/93* (2006.01)
*G01S 7/481* (2006.01)
*A47L 9/00* (2006.01)

(52) U.S. Cl.
CPC .......... *G01S 7/4813* (2013.01); *G01S 7/4815* (2013.01); *G01S 17/48* (2013.01); *G01S 17/936* (2013.01); *G05D 1/0225* (2013.01); *G05D 1/0238* (2013.01); *G05D 1/0242* (2013.01); *G05D 1/0246* (2013.01); *A47L 2201/04* (2013.01); *G05D 2201/0215* (2013.01)

(58) Field of Classification Search
CPC .. G05D 1/0225; G05D 1/0242; G05D 1/0238; G01S 7/4815; G01S 7/4823; G01S 17/936; G01S 17/48
USPC .................................................. 15/319, 339
See application file for complete search history.

(56) References Cited

U.S. PATENT DOCUMENTS

| | | |
|---|---|---|
| 2004/0158357 A1 | 8/2004 | Lee et al. |
| 2006/0050263 A1 | 3/2006 | Mizuo et al. |
| 2011/0057108 A1 | 3/2011 | Yao et al. |
| 2013/0331990 A1* | 12/2013 | Jeong .................... G01S 17/936 700/259 |

FOREIGN PATENT DOCUMENTS

| | | |
|---|---|---|
| KR | 10-2013-0034573 | 4/2013 |
| WO | 93/03399 | 2/1993 |

* cited by examiner

SENSOR MODULE AND ROBOT CLEANER HAVING THE SAME

CROSS-REFERENCE TO RELATED APPLICATIONS

This application claims the priority benefit of Korean Patent Application No. 10-2013-0039847, filed on Apr. 11, 2013 in the Korean Intellectual Property Office, the disclosure of which is incorporated herein by reference.

BACKGROUND

1. Field

Embodiments disclosed herein relate to a sensor module which is provided with a sensor to sense an obstacle and prevent the sensor from erroneously sensing an obstacle, and a robot cleaner having the same.

2. Description of the Related Art

A robot cleaner refers to an apparatus which autonomously travels about an area to be cleaned without user manipulation to perform cleaning by suctioning in foreign substances such as dust on the surface of a floor. The robot cleaner determines, through an obstacle sensing sensor, a distance to an obstacle such as furniture, office supplies and walls arranged in an area to be cleaned, and cleans the area, changing the travel direction by selectively driving a left wheel motor and a right wheel motor.

The obstacle sensing sensor of the robot cleaner may be an optical sensor. The obstacle sensing sensor may include a light emitting unit to emit light and a light receiving unit to receive light emitted from the light emitting unit and reflected from an obstacle. According to light reflected from the obstacle transmitted to the light receiving unit, the distance to the obstacle may be measured.

A housing forming the external appearance of the robot cleaner may be provided with a transparent sensor window. Light emitted from the light emitting unit may be transmitted to the outside through the sensor window. At this time, the light emitted from the light emitting unit may not be transmitted to the outside, but may be reflected from the inner surface of the sensor window and be incident on the light receiving unit. In the case that the light reflected from the sensor window is incident on the light receiving unit, the robot cleaner may erroneously act as if there is an obstacle in front thereof, thereby failing to accurately perform sensing of an obstacle.

SUMMARY

Therefore, it is an aspect of the present invention to provide a sensor module which may provide accurate sensing of an obstacle by preventing erroneously sensing irrelevant light as if an obstacle is in front of a robot cleaner when light emitted from a light emitting unit is reflected from the inner surface of the sensor window sensor module and a robot cleaner having the same.

Additional aspects of the invention will be set forth in part in the description which follows and, in part, will be apparent from the description, or may be learned by practice of the invention.

In accordance with an aspect of the present invention, a robot cleaner includes a body including a cleaning unit to remove foreign substances from a surface of a floor and a wheel unit to rotate via power transmitted thereto from a motor, a cover to cover an upper portion of the body, a sensor module including an obstacle sensor mounted to the body to sense an obstacle, and a sensor window provided at one side of the sensor module, wherein the sensor module includes a light emitting device to emit light outside through the sensor window, a light receiving reflector on which light emitted from the light emitting device and reflected from the obstacle is incident, and a light shielding portion interposed between the light emitting device and the light receiving reflector to block the light emitted from the light emitting device from being reflected from an inner surface of the sensor window and incident upon the light receiving reflector.

The sensor module may include a base frame and an upper frame coupled to the base frame.

A slit may be formed at one side of a front of the upper frame, and the light shielding portion may be an upper surface of the upper frame forming the slit.

The light emitting device may be mounted to the base frame to correspond to a position of the slit, and the light emitted from the light emitting device may radiate forward through the slit.

A step portion may be formed on a front upper surface of the upper frame to prevent failure to sense a close obstacle. That is, the step portion may enable the robot cleaner to sense objects or obstacles at a relatively closer distance.

The light receiving reflector may be mounted to the upper frame.

The upper frame may be provided with a mount protruding upward, and the light receiving reflector may be mounted to an upper side of the mount.

The upper frame may be provided with a hole at a position corresponding to a lower portion of the mount.

The base frame may be provided with a light receiving unit camera to receive information about the reflected light incident upon the light receiving reflector, the light receiving unit camera being arranged to face the light receiving reflector.

A docking sensor to transmit a signal to or receive a signal from the docking station may be mounted to the mount.

The docking sensor may be positioned at an upper portion of the light receiving reflector.

A bracket to space the docking sensor from the light receiving reflector may be interposed between the docking sensor and the light receiving reflector.

The base frame may be provided with a remote control signal reception portion to receive a signal from a remote control.

The sensor module may be modularized as one unit by mounting the light emitting device to the base frame, mounting the light receiving reflector to the upper frame, and coupling the base frame to the upper frame, and the sensor module may be mounted to a front of the body.

The sensor window may be integrated with the sensor module.

In accordance with another aspect of the present invention, a sensor module includes a base frame, a plurality of light emitting devices mounted to the base frame, a light shielding portion positioned at an upper portion of each of the light emitting devices, a light receiving reflector provided at an upper portion of the light shielding portion, and a light receiving unit camera mounted to the base frame to receive, at a lower portion of the light receiving reflector, an image relevant to light incident upon the light receiving reflector, wherein the base frame, the light emitting devices, the light shielding portion, the light receiving reflector, and the light receiving unit camera are integrated with each other.

A slit may be formed at one side of the light shielding portion, and a corresponding one of the light emitting devices may be provided at a position corresponding to the slit, such that light emitted from the light emitting device is radiated outside through the slit.

The sensor module may further include a sensor window coupled to the base frame or the light shielding portion.

The base frame, the light shielding portion and the sensor window may be integrated with each other.

A step portion may be formed on a front upper surface of the light shielding portion.

In accordance with another aspect of the present invention, a sensor module may include a base frame, a light emitting device mounted to the base frame to emit light through a sensor window toward an object; a light receiving unit camera to receive light emitted from the light emitting device and reflected from the obstacle, and a light shielding portion positioned above the light emitting device to prevent light emitted from the light emitting device and reflected from an inner surface of the sensor window from being received by the light receiving camera. The sensor module may further include a light receiving reflector to receive light emitted from the light emitting device and reflected from the obstacle, and to reflect the light emitted from the light emitting device and reflected from the obstacle to the light receiving unit camera.

The light shielding portion may include an upper frame disposed above the base frame and the light emitting device, and a bottom surface of the upper frame may prevent light emitted from the light emitting device and reflected from the inner surface of the sensor window from being received by the light receiving camera.

The sensor module may further include a mount disposed on an upper surface of the upper frame, and the light receiving unit camera may be arranged on the mount to receive light emitted from the light emitting device and reflected from the obstacle directly. An end portion of the upper frame adjacent to the inner surface of the sensor window may step down at an incline toward the inner surface of the sensor window.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
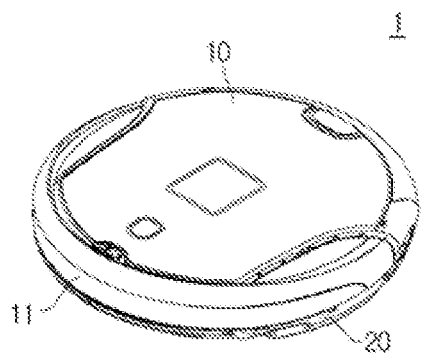
FIG. 1 is a perspective view showing a robot cleaner according to an exemplary embodiment of the present invention.

Reference will now be made in detail to the embodiments of the present invention, examples of which are illustrated in the accompanying drawings, wherein like reference numerals refer to like elements throughout.

Hereinafter, a sensor module according to an embodiment of the present invention and a robot cleaner having the same will be described in detail with reference to the drawings.

Figure 2:
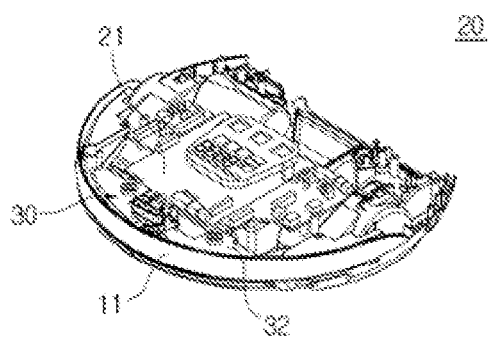
FIG. 2 is a view showing the robot cleaner of FIG. 1, with a cover of the robot cleaner removed.
Figure 3:
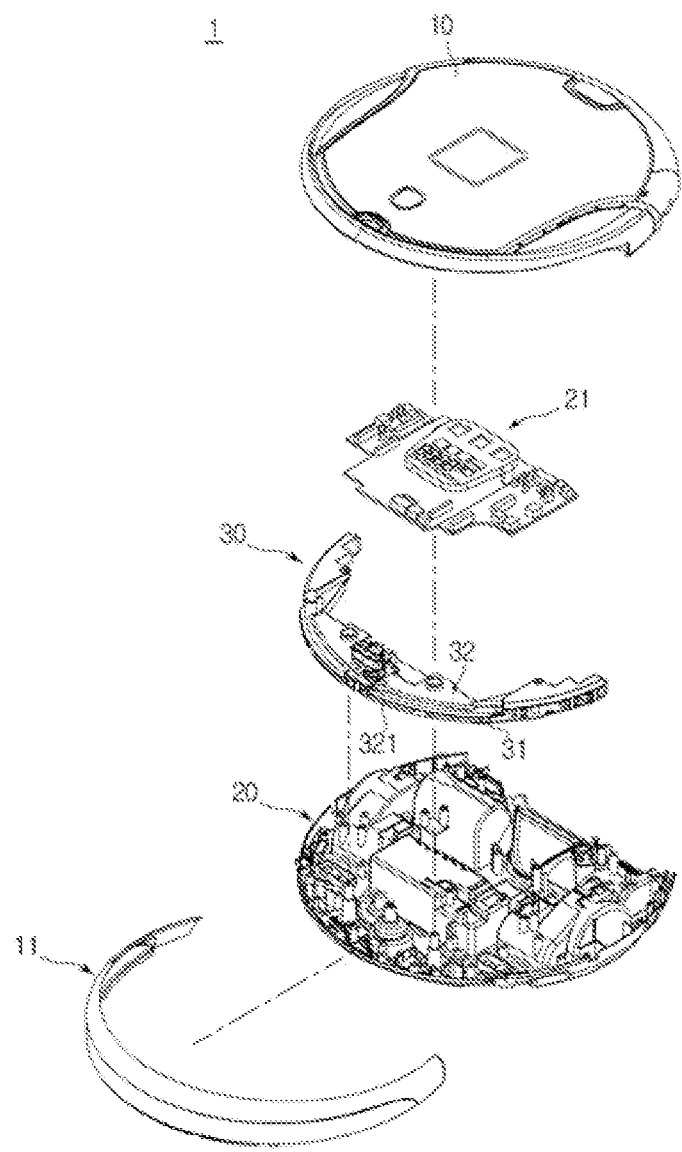
FIG. 3 is an exploded view showing a sensor module of the robot cleaner of FIG. 1.

FIG. 1 is a perspective view showing a robot cleaner according to an exemplary embodiment of the present invention, FIG. 2 is a view showing the robot cleaner of FIG. 1, with a cover of the robot cleaner removed, and FIG. 3 is an exploded view showing a sensor module of the robot cleaner of FIG. 1.

Referring to FIGS. 1 to 3, the robot cleaner 1 includes a cover 10 and a body 20. The cover 10 may cover the upper part of the body 20.

The body 20 may include a cleaning unit to remove foreign substances from the surface of a floor, a wheel unit to allow the robot cleaner 1 to travel, and a motor to supply power to the wheel unit. The wheel unit may include at least one wheel. The wheel rotates when power is transmitted thereto from the motor, thereby allowing the robot cleaner 1 to travel. The wheel unit and the motor may be referred to as a driving unit.

The robot cleaner 1 may include an electric power unit to supply electric power for driving. The electric power unit may include a battery electrically connected to each driving device adapted to drive a corresponding component mounted to the body 20 to supply power thereto. The battery may be a rechargeable secondary battery. The battery may be recharged by electric power supplied thereto from a docking station (not shown) when the body 20 is coupled to the docking station. The robot cleaner 1 may return to the docking station after completion of cleaning, for example. The robot cleaner 1 may be coupled to the docking station before performing a cleaning process, or during the cleaning process, also. For example, the robot cleaner 1 may be coupled to the docking station when a battery status is determined to be low, for example lower than a predetermined level, or when it is necessary or desired to empty a dust collector of the robot cleaner 1, as explained below. When the dust collector is being emptied, the battery of the robot cleaner 1 may be charged, for example.

The robot cleaner 1 may include at least one wheel to receive driving power from the electric power unit to rotate. For example, two wheels may be symmetrically disposed at the left and right edges of a central area of the lower portion of the body 20. Wheels allow the robot cleaner 1 to perform movement such as forward movement, backward movement, and turning while traveling. Due to operation of the wheels, the robot cleaner 1 may clean the surface of a floor. However, the disclosure is not limited to a robot cleaner 1 having two wheels. For example, the robot cleaner 1 may have one wheel, or three or more wheels.

A caster may be further installed at the front lower edge of the body 20 with respect to the travel direction. As the caster is provided, the robot cleaner 1 may be stabilized while traveling.

The robot cleaner 1 may include a cleaning unit. The cleaning unit may include a brush unit arranged at the side of a suction port formed at the lower side of the body. An inflow inlet connected to a dust collector may be formed at the lower portion of the body 20. Dust accumulated on the surface of a floor may be guided to the suction port when the brush unit rotates.

An air blower to generate suction force to suction in dust may be provided in the body 20 of the robot cleaner 1. The air blower may include a suction motor and a fan. The dust guided to the suction port may be caused to move to the dust collector by the air blower.

Once a certain amount of dust is collected in the dust collector in the robot cleaner, the robot cleaner 1 may move to and dock with the docking station. Alternatively, the dust collector may manually be emptied by a user, for example. Once the robot cleaner 1 docks with the docking station, the dust collected in the dust collector in the robot cleaner 1 may be suctioned into the dust collector in the docking station. The dust collected in the dust collector in the robot cleaner 1 and/or in the docking station may be disposed of by a user by separating the dust collector from the robot cleaner/docking station. Thereby, the dust collector of the robot cleaner 1 may be emptied manually by a user, or via the dust collector of the docking station.

A dust amount sensor may be provided in the body 20 to sense the amount of dust in the dust collector. When it is sensed by the dust amount sensor that dust has been collected in the dust collector to an amount equal to or greater than a reference amount, a controller may drive the wheels to allow the robot cleaner 1 to move and dock with the docking station. After the robot cleaner 1 docks with the docking station, the dust collected in the dust collector in the robot cleaner 1 may be suctioned into the dust collector provided in the docking station.

A sensor module 30 may be mounted to one side of the body 20. The sensor module 30 may include an obstacle sensor. The obstacle sensor may sense an obstacle positioned in front of the robot cleaner 1, for example. When it is sensed by the obstacle sensor that an obstacle is present in front of the robot cleaner 1, the controller may turn the body 2 of the robot cleaner 1 to change the direction of travel of the robot cleaner 1. Thereby, the robot cleaner 1 may continue traveling in order to perform a cleaning operation, while also avoiding the obstacle.

When the presence of an obstacle in front of the robot cleaner 1 with respect to the travel direction of the robot cleaner 1 is sensed, the robot cleaner 1 may turn in place to change the travel direction. Accordingly, a certain portion of the robot cleaner 1 faces forward in the travel direction. Therefore, the sensor module 30 or the obstacle sensor may be mounted to the certain portion of the robot cleaner 1 facing forward. The certain position at which the sensor module 30 is mounted may be defined as the front of the robot cleaner 1. Sensor modules may however be disposed at other locations of the robot cleaner 1, if desired, and may be used to detect the proximity to obstacles in directions other than a direction in which the robot is traveling.

A sensor window 11 may be mounted to the front of the body 20. The sensor window 11 may be formed of a material allowing light emitted from the obstacle sensor to be transmitted therethrough. The light emitted by the obstacle sensor may be transmitted to the outside through the sensor window 11. As shown in FIG. 3, for example, the robot cleaner 1 may be substantially circular in shape. However, the disclosure is not so limited. The robot cleaner 1 may be any shape (e.g., rectangular, square, or other polygonal or geometric shapes). As shown in FIG. 3, the sensor window 11 may generally conform to the shape of the robot cleaner 1 and be mounted to the front of the body 20. The sensor window 11 may partially extend about the perimeter of the robot cleaner 1 for example. That is, as shown in FIG. 3, the sensor window 11 may have a semi-circular shape and partially extend around the robot cleaner in a circumferential manner.

The body 20 may be provided with a printed circuit board (PCB) circuit 21 to receive information relevant to operation of the robot cleaner 1 and transmit information to cause the robot cleaner 1 to perform a specific operation. The PCB circuit 21 may be seated on the upper portion of the body 20. The upper surface of the PCB circuit 21 may be covered by the cover 10.

Hereinafter, the configuration or construction of the sensor module 30 according to an example embodiment of the present invention will be described in detail.

Figure 4:
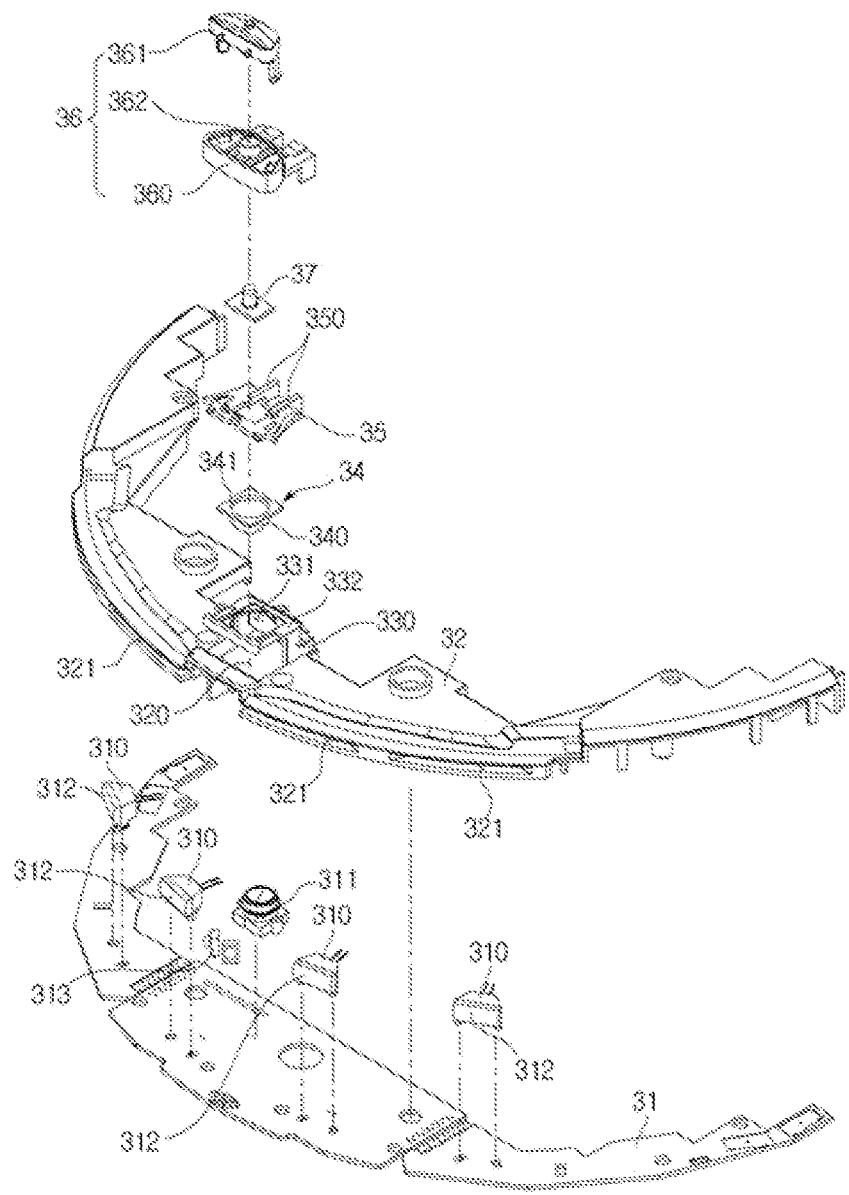
FIG. 4 is an exploded perspective view showing the sensor module of FIG. 3.

FIG. 4 is an exploded perspective view showing the sensor module of FIG. 3.

Referring to FIG. 4, the sensor module 30 may include a base frame 31, an upper frame 32, and a sensor assembly. The sensor assembly may include a light emitting device 310, a light receiving reflector 34, and a light receiving unit camera 311. The light emitting device 310, the light receiving reflector 34 and the light receiving unit camera 311 may be mounted to the base frame 31 or the upper frame 32, and the base frame 31 and the upper frame 32 may be coupled to each other by a fastening member. For example, the fastening member may include one or more of a screw, bolt, glue, solder, and the like, however the disclosure is not so limited and may include other types of fastening members as would be understood by those of skill in the art. The sensor module 30 may be fabricated as one module. Accordingly, ease of assembly of the robot cleaner 1 may be enhanced by an integrally formed sensor module 30.

The light emitting device 310 and the light receiving unit camera 311 may be mounted to the base frame 31. A plurality of the light emitting devices 310 may be provided. In FIG. 4, four light emitting devices 310 are shown. However, the disclosure is not so limited. The robot cleaner 1 may include one, two, three, or more than four light emitting devices 310, as desired. The plurality of the light emitting devices 310 may be disposed at regular or irregular intervals. For example, the light receiving unit camera 311 may be arranged at a position corresponding to the light receiving reflector 34 mounted to the upper frame 32. As shown in FIG. 4, the base frame 31 and upper frame 32 may generally conform to the shape of the robot cleaner 1 and be mounted to the front of the body 20. The base frame 31 and upper frame 32 may partially extend about the perimeter of the robot cleaner 1 for example. That is, as shown in FIG. 4, the base frame 31 and upper frame 32 may have a semi-circular shape and partially extend around the robot cleaner in a circumferential manner. Likewise, the light emitting device 310, the light receiving reflector 34 and the light receiving unit camera 311 may be mounted to the base frame 31 or the upper frame 32 at constant or irregular intervals, in a circumferential or arc-like manner.

The plurality of light emitting devices 310 may be mounted to the base frame 31. For example, the light emitting device 310 may be an infrared light emitting diode to emit infrared light. A wide angle lens 312 to convert light emitted from the light emitting device 310 into a line light may be mounted to the front of the light emitting device 310. The wide angle lens 312 may widen the field of view of the light emitting device 310. That is, the light emitted from the light emitting device 310 may be allowed to emit through a wider angle of emission by the wide angle lens 312, and therefore a wider area may be covered by light emitted from one light emitting device 310 to sense an obstacle. Thereby, even when the light emitting devices 310 are disposed at constant intervals, a blind spot having an obstacle that is positioned in front of the robot cleaner 1 but is not sensed may be avoided. A lenticular lens to collect line lights may be further provided at one side of the light emitting device 310 or the wide angle lens 312. If provided, the wide angle lens 312 may be provided at some or all of the light emitting devices 310.

A remote control signal reception portion 313 may be mounted to one side of the base frame 31. The remote control signal reception portion 313 may receive a signal from a remote control and then transmit the signal to the controller. Then, the controller may cause the robot cleaner 1 to perform an operation corresponding to the signal.

A plurality of slits 321 may be formed at one side of the front of the upper frame 32. The light emitting devices 310 may be provided at positions corresponding to the slits 321. The light emitting devices 310 may be arranged at the back or inner side of the slits 321, and the light emitted from the light emitting devices 310 may be transmitted forward from the robot cleaner 1 through the slits 321.

The slits 321 serve to collect light emitted from the light emitting devices 310 such that the light is transmitted forward from the robot cleaner 1. In addition, the upper sides of the light emitting devices 310 may be covered by the slits 321 such that light is shielded. As the upper sides of the light emitting devices 310 are shielded, the light emitted from the light emitting devices 310 may be prevented from being reflected from the inner surface of the sensor window 11 and from being incident on the light receiving reflectors 340 positioned at the upper portions of the light emitting devices 310. Thereby, the erroneous sensing of the presence of an obstacle that is not actually in front of the robot cleaner 1 may be prevented.

The upper frame 32 may be provided with a mount 330 protruding upward from the upper frame 32. The mount 330 may be integrally formed with the upper frame 32 through injection molding, or may be separately fabricated and mounted to the upper frame 32. A seating portion 332 allowing the light receiving reflector 340 to be mounted thereto may be provided at the upper side of the mount 330. A hole 331 penetrated by the light receiving reflector 340 may be formed in the seating portion 332.

A lens frame 341 may be mounted to the light receiving reflector 340. The lens frame 341 may be seated on the seating portion 332. At this time, the light receiving reflector 340 may protrude downward from the seating portion 332 through the hole 331. Thereby, the upper frame 32 may be mounted such that the light receiving reflector 340 is exposed. For example, as shown in FIG. 4 and FIG. 5, a bottom portion of the light receiving reflector 340 may be disposed below the seating portion 332 of mount 330, such that light which reflects off an object or obstacle T and passes through sensor window 11, may be incident to an exposed portion of the light receiving reflector 340.

The upper frame 32 positioned at the lower portion of the light receiving reflector 340 may be provided with a hole 320. The light receiving unit camera 311 may be provided at the lower portion or inner side of the hole 320. When reflected light is incident on the light receiving reflector 340, the light receiving unit camera 311 may receive information about the reflected light incident on the light receiving reflector 340 and transmit the information to the controller.

Figure 5:
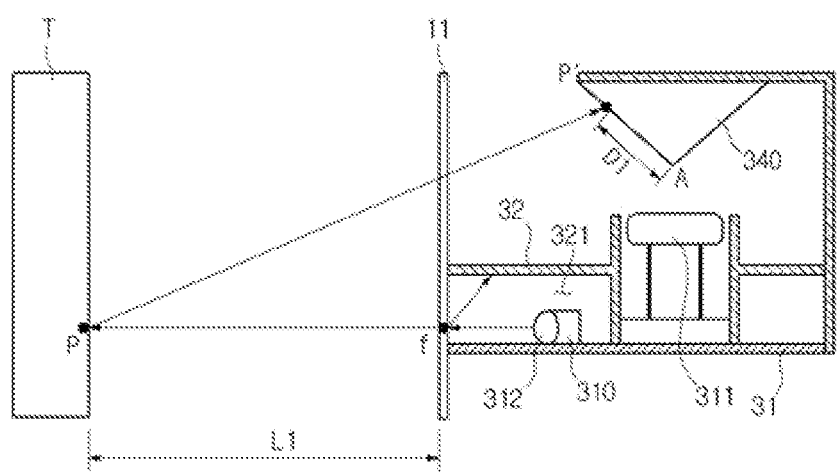
FIG. 5 is a view schematically illustrating sensing of an obstacle by the sensor module of FIG. 3.

The light receiving reflector 340 may be formed in a conical shape, as shown in FIG. 5, for example. Accordingly, when the light receiving reflector 340 is mounted to the upper frame 32 with the lens frame 341 seated on the seating portion 332, the light receiving reflector 340 may be arranged such that the bottom surface thereof faces upward and the vertex thereof faces downward. A lenticular lens may be further provided to the light receiving reflector 340 or the light receiving unit camera 311 to increase resolution of the reception portion.

A docking sensor 37 may be mounted to the mount 330. The docking sensor 37 may transmit a signal to a signal reception portion provided to or by (e.g., at) the docking station (not shown) of the robot cleaner 1. For example, when dust collected in the robot cleaner 1 needs to be removed or the robot cleaner 1 needs to be charged, the location of the robot cleaner 1 may be sensed by the docking sensor 37, and then the robot cleaner 1 may be guided to the docking station.

A turret 36 may be mounted to the mount 330. The turret 36 may include a sensor mounting portion 360 and an upper cover 361. The sensor mounting portion 360 may be mounted to the mount 330. A hole 362 allowing the docking sensor 37 to be inserted thereinto may be formed in the sensor mounting portion 360. The docking sensor 37 may be inserted into the hole 362 and fixed. The upper cover 361 may be mounted to cover the upper portion of the sensor mounting portion 360 such that the docking sensor 37 is not exposed, for example, to the external environment.

When the sensor mounting portion 360 is positioned at the upper side of the light receiving reflector 34, a bracket 35 may be interposed between the light receiving reflector 34 and the docking sensor 37 to space the light receiving reflector 340 and the docking sensor 37 apart from each other. A protruding rib 350 may be provided to the bracket 35. The bracket 35 may be mounted to the mount 330 or the seating portion 332 and positioned between the light receiving reflector 34 and the docking sensor 37 with the light receiving reflector 34 and the docking sensor 37 spaced apart from each other by the protruding rib 350.

In the structure as disclosed above, the sensor module 30 may include the sensor assembly, the remote control signal reception portion 313, and the docking sensor 37, and two or more of these components may be modularized (or integrally formed) as one unit. Thereby, the efficiency of assembly of the robot cleaner 1 may be improved.

FIG. 5 is a view schematically illustrating sensing of an obstacle by the sensor module of FIG. 3.

Referring to FIG. 5, light emitted from the light emitting device 310 of the sensor module 30 may be reflected from the surface P of an obstacle T positioned in front of the robot cleaner 1 and incident on the point P' of the light receiving reflector 340. The image of the light incident on the light receiving reflector 340 may be input to the light receiving unit camera 311 positioned on the lower portion of the light receiving reflector 340. Then, the light receiving unit camera 311 may transmit information about the image of the light incident on the light receiving reflector 340 to the controller (not shown). Thereby, the presence of the obstacle T in front of the robot cleaner 1 may be sensed.

Meanwhile, light emitted from the light emitting device 310 may be reflected from the inner surface f of the sensor window 11. The light reflected from the inner surface f of the sensor window 11 may be prevented from being incident upon the light receiving reflector 340, by the inner surface of the upper portion of the upper frame 32 forming the slits 321. Thereby, the light reflected from the inner surface f of the sensor window 11 is prevented from causing an erroneous sensing of the presence of an obstacle.

In the example embodiments disclosed herein, the light receiving reflector 340 may be arranged on the mount 330 protruding upward from the upper frame 32, and the light receiving unit camera 311 may be arranged at the lower portion of the light receiving reflector 340. Light emitted from the light emitting device 310 may be reflected and incident upon the light receiving reflector 340, and the information about the image of the light incident on the light receiving reflector 340 may be transmitted to the controller (not shown).

Alternatively, the light receiving unit camera 311 may be arranged or disposed on the mount 330 protruding upward from the upper frame 32 such that light emitted from the light emitting device 310 is reflected and directly incident on the light receiving unit camera 311. In this case, light emitted from the light emitting device 310 may be reflected and incident upon the light receiving unit camera 311, and then the light receiving unit camera 311 may transmit the information about the image of the incident light to the controller (not shown).

In this case, light emitted from the light emitting device 310 may be transmitted forward from the robot cleaner 1 through the slits 321, and the upper side of the light emitting device 310 may be shielded against the light. As the upper side of the light emitting device 310 is shielded, light emitted from the light emitting device 310 may be prevented from being reflected from the inner surface of the sensor window 11 and incident upon the light receiving unit camera 311 positioned on the upper portion of the light emitting device 310. Thereby, the light from the light emitting devices 310 may be transmitted forward from the robot cleaner 1 through the slits 321 in the form of a line light, and erroneous sensing of the presence of an obstacle that is not in front of the robot cleaner 1 may be prevented.

Figure 6:
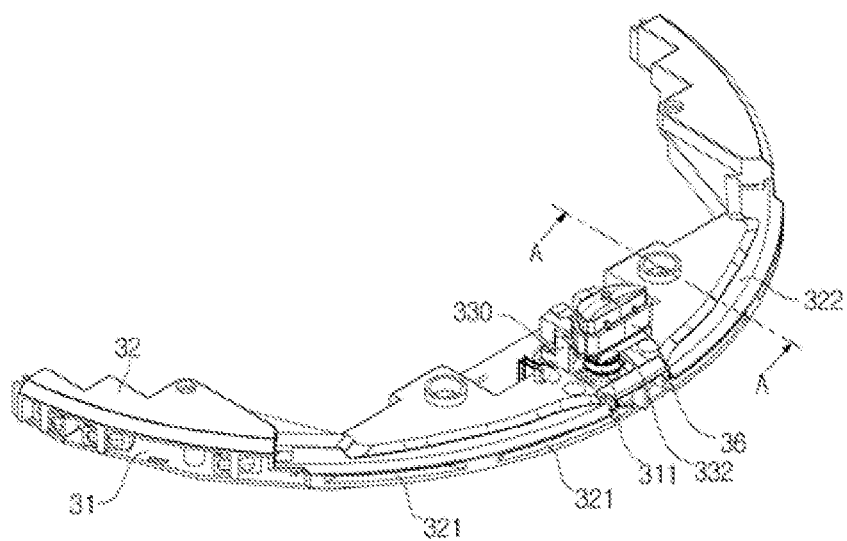
FIG. 6 is a view partially showing a sensor module according to an embodiment of the present invention.
Figure 7:
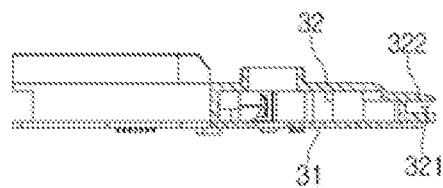
FIG. 7 is a cross-sectional view showing the sensor module of FIG. 6.
Figure 8:
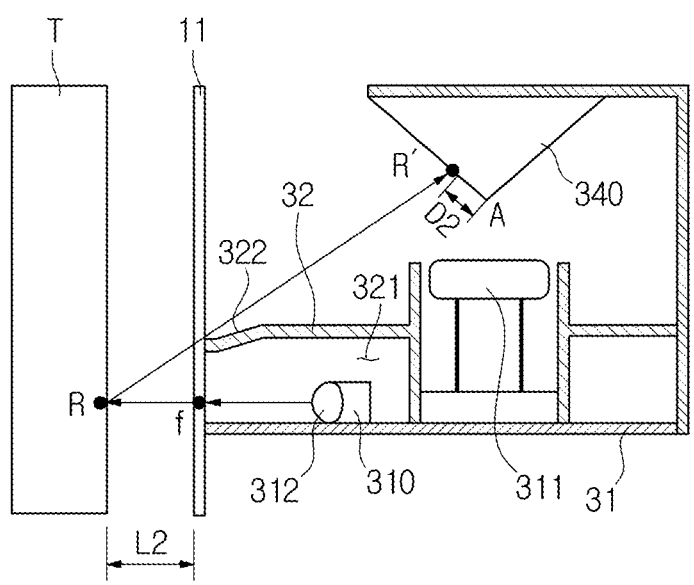
FIG. 8 is a view schematically illustrating sensing of an obstacle by the sensor module of FIG. 6.

FIG. 6 is a view partially showing a sensor module according to an embodiment of the present invention, FIG. 7 is a cross-sectional view showing the sensor module of FIG. 6, and FIG. 8 is a view schematically illustrating sensing of an obstacle by the sensor module of FIG. 6.

Referring to FIGS. 6 and 7, a step portion 322 may be formed at the upper frame 32 of a sensor module 30 of the illustrated embodiment. The step portion 322 may be formed on the front upper surface of the upper frame 32. Specifically, the step portion 322 may be formed on the upper surface of the upper frame 320 forming the slits 321. As the step portion 322 is formed, light reflected from an obstacle close to the robot cleaner 1 may be prevented from being intercepted by the upper surface of the upper frame 32 forming the slits 321 failing to be incident upon the light receiving reflector 340.

Referring to FIG. 8, when there is an object or obstacle T positioned closed to the robot cleaner 1, light from the light emitting device 310 may be emitted onto the obstacle T. The light reflected from the surface R of the obstacle T may be received at the point R' of the light receiving reflector 340. As shown in FIG. 8, the path of the light reflected from the surface R of the obstacle T is not obstructed by the upper surface of the upper frame 32 forming the slits 321 since the step portion 322 is formed on the front upper surface of the upper frame 32. Thereby, the obstacle T positioned close to the robot cleaner 1 may be accurately sensed even though the upper frame 32 protrudes forward over the mounting position of the light emitting device 310. That is, step portion 322 may extend from the upper frame 32 at an downward incline or angle toward the sensor window 11. By way of comparison, the example embodiment of FIG. 5 does not include the step portion 322, and the upper frame 32 may extend above the light emitting device 310 toward the sensor window 11.

As the distance between the obstacle T and the robot cleaner 1 decreases, the distance from the vertex of the light receiving reflector 340 to the point upon which the light reflected from the obstacle T is incident may also decrease. Referring to FIGS. 5 and 8, the distance L1 between the obstacle T and the robot cleaner 1 shown in FIG. 5 is greater than the distance L2 between the obstacle T and the robot cleaner 1 shown in FIG. 8. The light reflected from the obstacle T shown in FIG. 5 may be incident upon the point P' of the light receiving reflector 340. The distance from the vertex A of the light receiving reflector 340 to the point P' may be defined as D1. The light reflected from the obstacle T shown in FIG. 8 may be incident upon the point R' of the light receiving reflector 340. The distance from the vertex A of the light receiving reflector 340 to the point R' may be defined as D2. Herein, D1 is greater than D2. That is, a relationship may be established or perceived that as the distance between the robot cleaner 1 and an obstacle T increases, the distance between the vertex A of the light receiving reflector 340 and the point of incidence upon the light receiving reflector 340 increases. Therefore, the distance from the robot cleaner 1 to the obstacle T may be measured according to the distance from the vertex A of the light receiving reflector 340 to the point upon which the light reflected from the obstacle T is incident. The light receiving unit camera 311 may transmit information about the light incident upon the light receiving reflector 340 to the controller, and then the controller may measure the location of the obstacle T using the information on the position on which the light is incident, and adjust the direction of movement of the robot cleaner 1.

Figure 9:
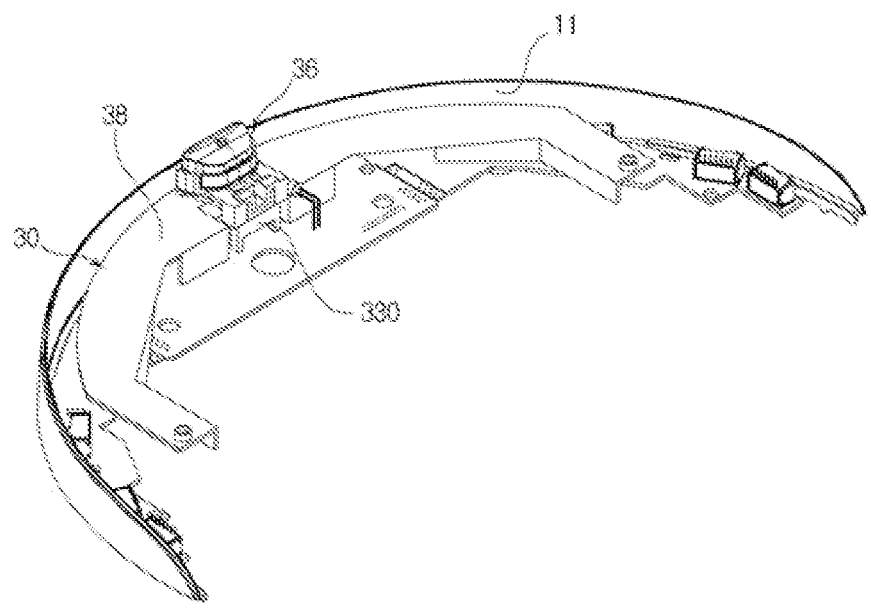
FIG. 9 is a view showing a sensor module according to an embodiment of the present invention.

FIG. 9 is a view showing a sensor module according to another embodiment of the present invention.

Referring to FIG. 9, the sensor module 30 of the illustrated embodiment may include a base frame 31, a light shield panel 38 and a sensor window 11. The base frame 31 may be coupled to the light shield panel 38, and the sensor window 11 may be coupled to the base frame 31 or the light shield panel 38.

Similar to the sensor module 30 of the previous example embodiment, the light emitting device 310 and the light receiving unit camera 311 may be mounted to the base frame 31, and the light receiving reflector 34 and the docking sensor 37 may be mounted to the light shield panel 38.

The light shield panel 38 may be positioned at the upper portion of the light emitting device 310 mounted to the base frame 31. The light shield panel 38 may prevent the light emitted from the light emitting device 310 from being reflected from the inner surface of the sensor window 11 and incident upon the light receiving reflector 340. Thereby, an erroneous sensing of the presence of an obstacle that is not in front of the robot cleaner 1 may be prevented. Meanwhile, a step portion may be formed on the front upper surface of the light shield panel 38, similar to the step portion 322 formed at the upper frame 32 in the previous example embodiment. Thereby, an obstacle close to the robot cleaner 1 may be accurately sensed.

The sensor window 11 may be modularized. That is, the sensor module 30 may include the sensor window 11. Accordingly, in assembling the robot cleaner 1, the sensor window 11 does not need to be separately connected. Therefore, the efficiency of assembly of the robot cleaner 1 may be enhanced.

The sensor window 11 may be integrated with the light shield panel 38. That is, the sensor module 30 and the light shield panel 38 may be integrated and provided to the robot cleaner 1 as one unit. As the sensor module 30 and the light shield panel 38 are integrated to be provided to the robot cleaner 1, the efficiency of assembly of the robot cleaner 1 may be enhanced.

The slits 321 of the upper frame 32 or the light shield panel 38 provided to prevent light emitted from the light emitting device 310 from being reflected from the inner surface of the sensor window 11 and incident upon the light receiving reflector 340 may be defined or referred to as a light shielding portion.

As a modularized sensor to sense an obstacle is mounted to the robot cleaner 1, the efficiency of assembly of the robot cleaner 1 may be enhanced. In addition, as the sensor module is provided with a light shielding portion, the light emitted from a light emitting device may be prevented from being reflected from the inner side of the sensor window and incident upon a light receiving reflector, thereby preventing an erroneous sensing of an obstacle. When a step portion is formed on the front upper portion of the light shielding portion, an obstacle positioned closer to the robot cleaner may also be more accurately sensed. That is, the step portion enables an object to be sensed by the robot cleaner at a closer distance relative to an embodiment of the robot cleaner which does not include the step portion. Because the robot cleaner is able to sense an object at a closer distance, the robot cleaner may be operated more closely to objects without contacting the object, allowing the robot cleaner to perform a more thorough job of cleaning while maintaining separation from the object.

As is apparent from the above description, a sensor module and robot cleaner according to the example embodiments disclose herein may prevent erroneous sensing when an obstacle is not actually present in front of the robot cleaner, ensuring that the sensor accurately senses obstacles. In addition, as the sensor to be mounted to the robot cleaner is modularized, the efficiency of assembly of the robot cleaner may be enhanced.

The robot cleaner according to the above-described example embodiments may use one or more processors. For example, the controller of the robot cleaner may be embodied as a processing device and may be implemented using one or more general-purpose or special purpose computers, such as, for example, a processor, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions or operations in a defined manner.

Although example embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A robot cleaner comprising:
    a body including a cleaning unit to perform a cleaning operation;
    a cover to cover an upper portion of the body;
    a sensor module mounted to the body to sense an obstacle; and
    a sensor window provided at one side of the sensor module,
    wherein the sensor module comprises:
        a light emitting device mounted to a base frame to emit light through the sensor window;
        a light receiving reflector on which light emitted from the light emitting device and reflected from the obstacle is incident; and
        a light shielding portion, mounted to the base frame and interposed between the light emitting device and the light receiving reflector to block the light emitted from the light emitting device from being reflected from an inner surface of the sensor window and incident upon the light receiving reflector.

2. The robot cleaner according to claim 1, wherein the sensor module comprises an upper frame coupled to the base frame.

3. The robot cleaner according to claim 2, wherein a slit is formed at one side of a front of the upper frame, and the light shielding portion includes an upper surface of the upper frame forming the slit.

4. The robot cleaner according to claim 3, wherein the light emitting device corresponds to a position of the slit, and the light emitted from the light emitting device radiates forward through the slit.

5. The robot cleaner according to claim 3, wherein a step portion is formed on a front upper surface of the upper frame.

6. The robot cleaner according to claim 2, wherein the light receiving reflector is mounted to the upper frame.

7. The robot cleaner according to claim 6, wherein the upper frame is provided with a mount protruding upward, and the light receiving reflector is mounted to an upper side of the mount.

8. The robot cleaner according to claim 7, wherein the upper frame is provided with a hole at a position corresponding to a lower portion of the mount.

9. The robot cleaner according to claim 8, wherein the base frame is provided with a light receiving unit camera to receive information about the reflected light incident upon the light receiving reflector, the light receiving unit camera arranged to face the light receiving reflector.

10. The robot cleaner according to claim 7, wherein a docking sensor to communicate with the docking station is mounted to the mount.

11. The robot cleaner according to claim 10, wherein the docking sensor is positioned above the light receiving reflector.

12. The robot cleaner according to claim 11, wherein a bracket to space the docking sensor from the light receiving reflector is interposed between the docking sensor and the light receiving reflector.

13. The robot cleaner according to claim 2, wherein the base frame is provided with a remote control signal reception portion to receive a signal from a remote control.

14. The robot cleaner according to claim 2, wherein, the sensor module is modularized as one unit by mounting the light receiving reflector to the upper frame, and coupling the base frame to the upper frame, and the sensor module is mounted to a front of the body.

15. The robot cleaner according to claim 1, wherein the sensor window is integrated with the sensor module.

* * * * *